United States Patent [19]

de Bruyne

[11] 4,317,005
[45] Feb. 23, 1982

[54] POSITION-DETERMINING SYSTEM

[76] Inventor: Pieter de Bruyne, Probsteistr 79, CH8051 Zurich, Switzerland

[21] Appl. No.: 84,905

[22] Filed: Oct. 15, 1979

[51] Int. Cl.³ ............................................. G08C 21/00
[52] U.S. Cl. ........................................ 178/19; 178/18
[58] Field of Search .................................... 178/18, 19

[56] References Cited
U.S. PATENT DOCUMENTS

| | | | |
|---|---|---|---|
| 3,613,066 | 10/1971 | Cooreman | 178/18 |
| 3,653,031 | 3/1972 | Hlady et al. | 178/18 |
| 4,012,588 | 3/1977 | Davis et al. | 178/18 |
| 4,018,989 | 4/1977 | Snyder et al. | 178/19 |
| 4,081,603 | 3/1978 | Davis et al. | 178/19 |

Primary Examiner—Thomas A. Robinson

Attorney, Agent, or Firm—E. Thorpe Barrett

[57] ABSTRACT

A graphic position-determining system incorporating two Sell-type transducers that generate acoustic shockwaves and receive their reflections from a surface whose position is to be determined and from fixed calibration reflectors positioned at known distances from the transducers. The design of the transducer includes plastic microspheres between a metalized membrane and a back-electrode to improve the sensitivity, the back-electrode having non-parallel surfaces to reduce unwanted vibrations and permit rapid damping. Apparatus is illustrated for determining the position of a movable cursor and for the verification or transmission of handwriting.

4 Claims, 7 Drawing Figures

POSITION-DETERMINING SYSTEM

SUMMARY OF THE INVENTION

This invention relates to an improved apparatus and method for determining the position of an object and in particular to the determination of such a position with respect to a predetermined coordinate pattern by the use of acoustic shockwaves that are transmitted in air and reflected from an object whose position is to be determined. An improved Sell-type transducer and the use of calibration reflectors further improves the operation of the system.

BACKGROUND OF THE INVENTION

Graphical devices utilizing an input signal corresponding in time to the location of an object are finding increased application in such fields as facsimile transmission, computer data input devices, type compositor and layout systems, computer graphics for the preparation of engineering and architectural drawings, and handwriting verification and analysis. The application of such position-determining systems, however, has been limited by cost and performance considerations: systems with high resolution and high accuracy are so expensive as to preclude their use in many applications. Even in applications where a high degree of accuracy is not a requirement, the relative high cost of available systems may limit or prohibit their use.

There have been many varieties of position-determining systems making use, in some cases, of waves transmitted through air and, in other systems, of waves transmitted by a solid medium. For example a stylus or cursor, whose position is to be determined, may include a spark generator that produces an acoustic shockwave that is received by a pair of linear transducers positioned in fixed coordinate planes. In such a system the accuracy is limited by such factors as the finite size of the spark and the jitter or change in spark location between succesive energizations of the gap, and the variations in the speed of transmission through the air between the source and the receptor because of drafts and temperature changes.

Another arrangement makes use of an array of wires embedded in a subsurface along perpendicular coordinates. A magnetic field is generated at the location of a cursor which is picked up at the location of the nearest coordinate intersection of the embedded wires and carried along the wires to receptors located at the respective ends of the wires. Such a system is expensive to manufacture, for the wires must be permanently embedded in precise locations to avoid substantial reading errors and many wires must be provided and connected to achieve acceptable resolution.

Systems are also manufactured using such embedded wires to transmit vibrational pulses introduced magnetostrictively by a magnetic field at the cursor. With all of these constructions, the problems of cost and accuracy continue to limit the practical applications.

The present invention overcomes many of these difficulties and permits the construction of a low-cost position-determining system that is capable of high resolution and high accuracy. A series of shock-waves generated by one or more linear transducers are transmitted through the air, reflected by the object whose position is to be determined and received by the same or other transducers. The bi-directional sound path permits accurate performance independent of the presence of strong air drafts. One or more calibration reflectors are used to further minimize errors caused by variations in the propagation velocity of the waves through the air. The particular arrangement of transducers and the calibration paths are dependent upon the application and the accuracy that is required.

It is accordingly an object of the invention to provide an apparatus and method for determining the position of an object with improved accuracy and at lower cost.

It is an object also to provide such a system that is highly versatile and suitable for a wide range of applications including signature verification and computer graphics as well as many other applications.

It is an object to provide a system in which versatility and simplicity of application are enhanced by the use of a passive wireless cursor whose position is determined by the reflection of air-borne waves.

A practical system of the kind described here must also be capable of measuring with considerable accuracy the position of an object of relatively small size, such as a hand-held stylus and which may move to within a short distance from the transducer. It is thus another object to provide an improved Sell-type transducer, suitable for both transmission and reception of ultrasonic shockwaves, that has increased sensitivity and is practical in a system based on the reflection of acoustic waves from a cursor or hand-held stylus.

Another object is to provide a Sell-type transducer having improved sensitivity coupled with rapid recovery time after the transmission of an acoustic shockwave.

These and other objects will be in part pointed out in, and in part apparent from, the following description considered in conjunction with the following drawings, in which.

Figure 1:
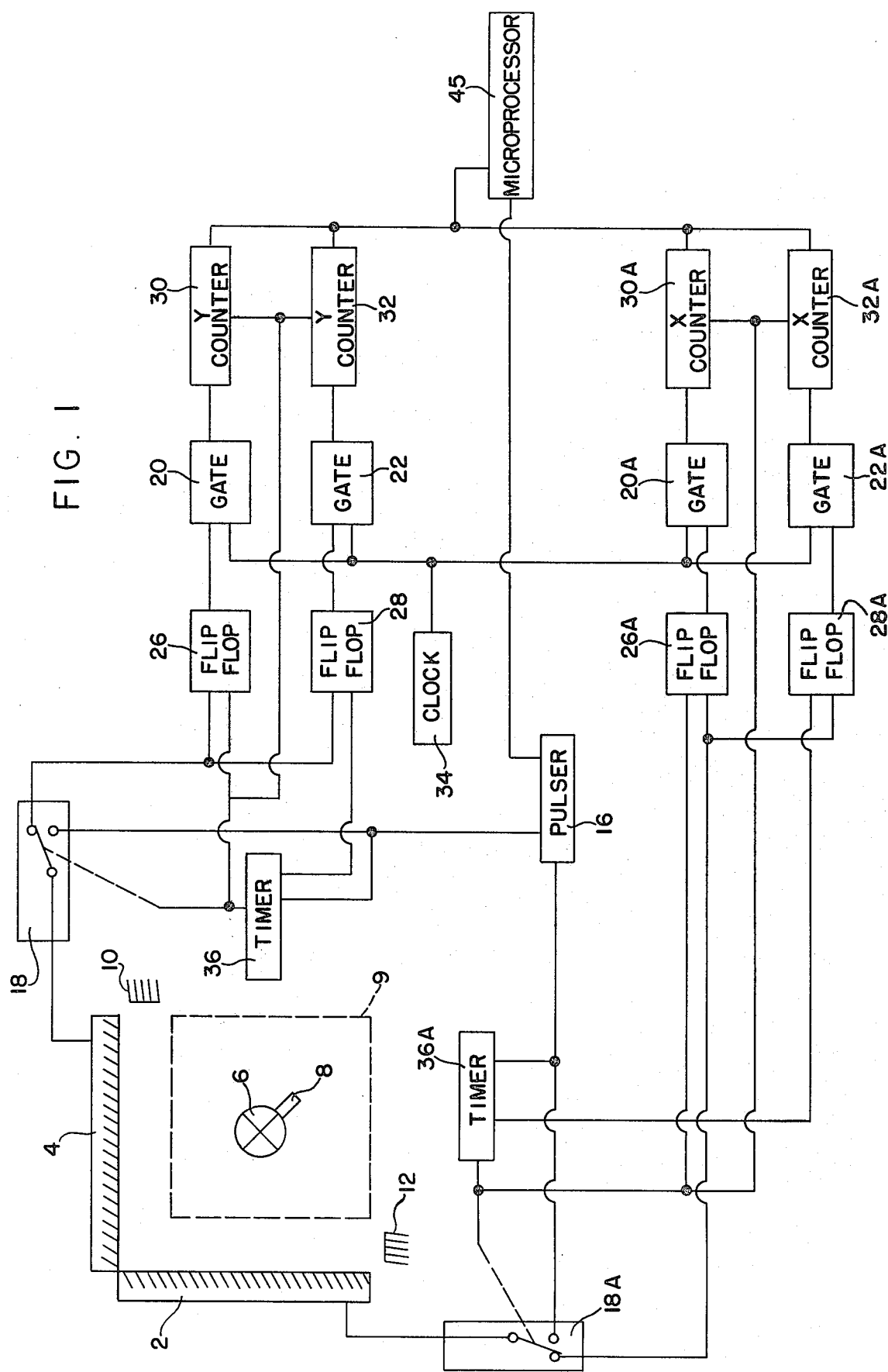
FIG. 1 is a block diagram of a position-determining system embodying the invention.

As shown in FIG. 1, two Sell-type linear transducers 2 and 4 are arranged to measure the position of a movable cursor 6 which is arranged to be manually positioned by a handle 8 within a pre-defined area, indicated by the broken line 9. In operation, a series of short acoustic pulses or shockwaves, generated by the transducer 2, strike the surface of the cursor 6 and are reflected to the same transducer where the pulses are received and translated into electrical signals. The cursor may be formed of transparent plastic or other material and is of such size and height that acoustic signals are reflected to the transducers. In practice, a plastic cursor about one and one-half inches in diameter and one-half inch high has been found satisfactory. The handle 8 is helpful in permitting manual movement of the cursor without interfering with the reflection of the sonic impulses.

These pulses are compressional air waves and are referred to herein as acoustic waves or pulses. The term acoustic as used herein encompasses both audible and ultrasonic frequencies, but the use of frequencies above the audible range is to be preferred. The time interval between the radiation of the acoustic pulse by the transducer 2 and the reception of the reflected signal from the cursor 6 is a function of the distance between the transducer 2 and the cursor 6. The accuracy of this measurement is affected by several factors including variations in the propagation velocity of the acoustic pulse between the transducer and the cursor, which is affected by temperature, humidity, pressure and wind currents.

To minimize the effects of variations in propagation velocity, a calibration reflector 10 is positioned at the far edge of the area 9 within which the position of the cursor 6 is to be determined. The acoustic pulses generated by the transducer 2 are reflected by the reflector 10, as well as by the cursor 6, and provide a basis for continual calibration that minimizes errors from variations in propagation velocity. Since the distance between the calibration reflector 10 and the transducer 2 is known, the ratio of the travel time to and from the cursor to the travel time to and from the calibration reflector is a function of the distance between the transducer and the cursor that is substantially independent of variations in the propagation velocity. The signals generated and received by the transducer 2 thus provide location information in the x axis.

The transducer 4 provides similar information for the y axis. Signals from the transducer 4 are reflected by the cursor 6 and also by a fixed reflector 12 located at the far edge of the area 9. These reflectors may be formed of any rigid material capable of reflecting the acoustic shockwaves. In practice, the reflectors 10 and 12 may be formed of a strip of plastic material positioned to face its associated transducer and extending an inch or so above and perpendicular to the surface area 9.

Figure 2:
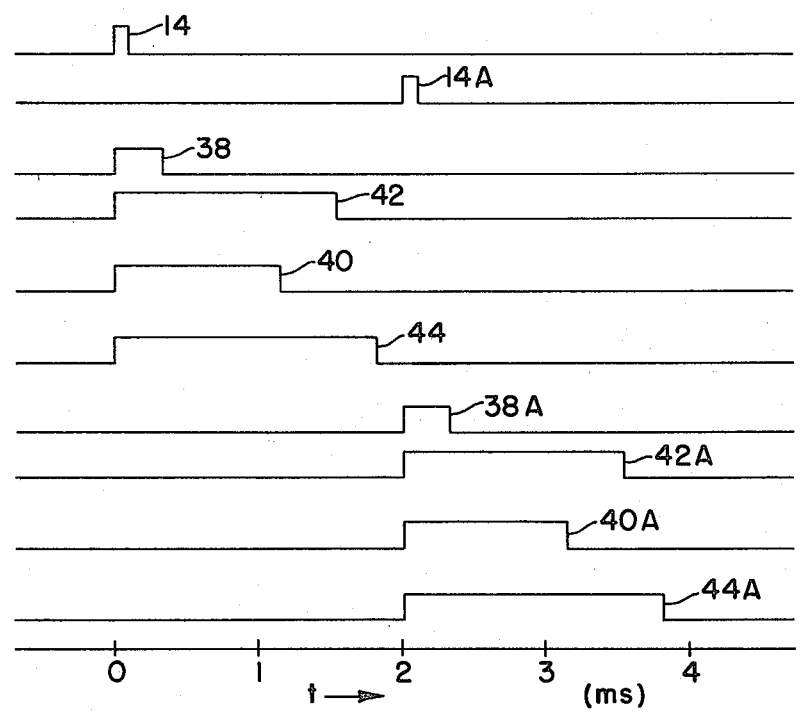
FIG. 2 is a timing diagram relating to the operation of the system shown in FIG. 1.

In operation, a pulse 14 (See the timing diagram in FIG. 2) from a pulse generator 16 is transmitted through a transmit-receive switch 18 to the transducer 4 where it produces a planar acoustic shockwave that is radiated in a direction perpendicular to the face of the transducer. The generation of this pulse 14, which passes through two gates 20 and 22, controlled respectively by two flip-flop circuits 26 and 28, causes two counters 30 and 32 to begin counting timing pulses generated by a clock 34. This pulse 14 also causes a timer 36 to begin generating four pulses: a first blanking pulse 38, which prevents the relay of signals from the transducer 4 for the period required by it to recover its sensitivity after being used as a transmitter; a second pulse 40 that continues until the signal reflected from the cursor 6 is received; a third blanking pulse 42 that continues until just before the calibration signal from the reflector 12 is received; and a fourth pulse 44 that continues until the calibration signal is received.

The reception of the signal reflected from the cursor 6 terminates the pulse 40 and resets the flip flop 26 to prevent further timing pulses from reaching the counter 30. The count thus accumulated in the counter 30 is proportional to the time required for the acoustic shockwave to travel from the transducer 4 to the cursor 6 and return to the transducer.

The pulse 42 inhibits the reception of signals from the transducer 4 that would otherwise cause the calibration counter 32 to cease counting upon the receipt of the signal from the cursor. Just before the expected return of the calibration signal from the reflector 12, the pulse 42 ends so that the signal, when it arrives and terminates the pulse 44, interrupts the action of the counter 32 so that its accumulated count represents the propagation time of the acoustic shockwave to and from the reflector 12. The information representing the position of the cursor 6 along the y axis is thus stored in the two counters 30 and 32.

A similar arrangement, in which similar parts are indicated by the same numerals followed by the letter "A," operates in conjunction with the transducer 2 to locate the cursor along the x axis.

When the pulse 14A is generated, following the completion of the cycle just described, it initiates a similar chain of events with respect to the transducer 2 and also causes the accumulated counts in counters 30 and 32 to be dumped into a microprocessor 45 and clears these counters for the ensuing cycle. The generation of the succeeding pulse 14 dumps the information from the counters 30A and 32A into the microprocessor and clears them for the next cycle.

The microprocessor 45 determines the ratio of the travel time of the acoustic shockwave to and from the cursor to the travel time to and from the calibration reflector as a measure of the position of the cursor, a ratio that is substantially independent of variations in propagation velocity caused by changes in ambient conditions.

The microprocessor converts the measurements into the desired units, adds the radius of the cursor, and subtracts a user defined quantity to relocate the origin of the measurement to a desired location.

The arrangement set forth by which the propagation times are computed, is only by way of illustration and other methods and apparatus known in the art may well be employed.

Figure 3:
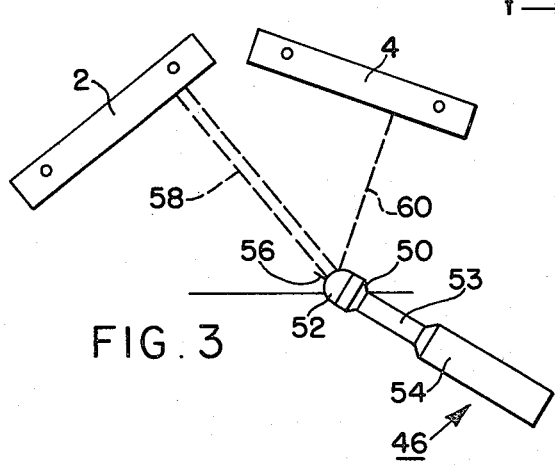
FIG. 3 is a diagrammatic representation of a system for the verification of a personal signature while it is being written.
Figure 4:
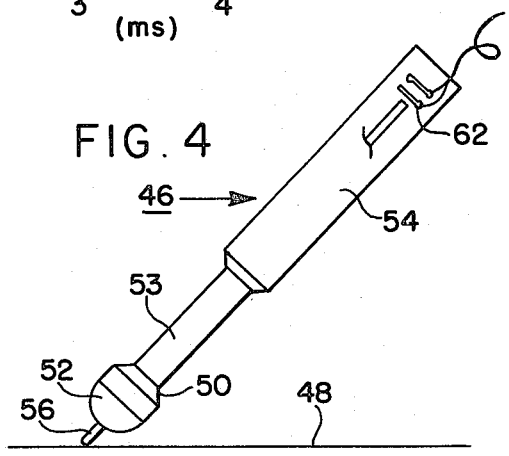
FIG. 4 is a further diagrammatic illustration of the apparatus of the system shown in FIG. 3.

FIGS. 3 and 4 show another arrangement of the transducers 2 and 4 in which the transmitting surfaces of the transducers 2 and 4 are positioned as an angle greater than 90 degrees and less than 180 degrees. Such an arrangement has particular utility in a system for the computer verification or transmission of handwriting. When used for such purpose, a hand-held stylus, generally indicated at 46, arranged to be moved on a surface 48, replaces the cursor and is provided with an enlarged portion 50 having a substantially spherical surface portion 52, of plastic or other material, that reflects the acoustic shockwaves. A section 53, between the ball reflector 52 and a handle 54, is of reduced diameter to provide a section where the stylus may be grasped by the fingers with minimum interference with the reflection of the pulses. The stylus, which may have an actual or simulated writing point 56, is moved over the writing surface 48 that supports the transducers 2 and 4, while its position is continually determined.

In this example, the transducer 2 operates as both a transmitter and receiver, as in the previous example, but the transducer 4 operates only as a receiver. The acoustic pulse transmitted by the transducer 2 strikes the spherical surface 52 and is reflected to the transducer 2 and also to the transducer 4. The interval between transmission and reception of a pulse from the transducer 2 is equal to twice the propagation time of the path indicated at 58. The interval between the transmission of a pulse from the transducer 2 and the reception of its reflection by the transducer 4 is represented by the propagation time of path 58, plus the propagation time of the path 60 from the stylus to the transducer 4.

The length of the path 58 can be determined by the general methods already described, and the length of the path 60 can be determined by subtraction. Since the measured paths are normal to the faces of the transducers, the x,y coordinates of the stylus can be determined. A microprocessor 45, as in FIG. 1, can be programmed to receive the information from the transducers and present it in any desired format.

In the verification and transmission of handwriting, the change in position of the stylus, rather than its exact location, is usually of primary importance and, for many applications, the calibration reflectors can be omitted. They can, where desirable, be used with the arrangement shown in FIG. 3 in the same way as earlier described.

The angle between the longitudinal axes of the transducers 2 and 4 will depend upon the particular application, the size of the transducers and the distance between their adjacent ends. Generally, they will be placed so that interference from the fingers of the writer will be minimal and the optimum angles for left and right-handed individuals will be different.

Any suitable switch arrangement, illustrated diagrammatically at 62 in FIG. 4, may be used to control the operation of the ranging circuits so that the stylus position is tracked only when it is in contact with the writing surface 48. The signature of an individual may be verified, using previously known segmentation and correlation techniques in conjunction with a suitable computer program, while the signature is being written.

Figure 5:
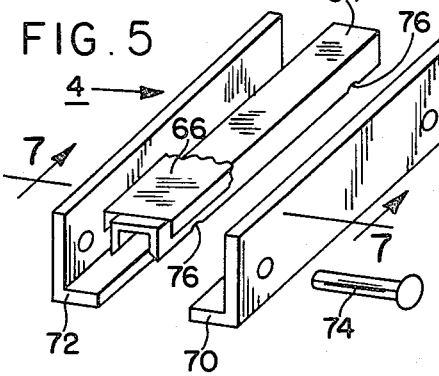
FIG. 5 is an exploded view of a transducer for use in the systems illustrated in FIGS. 1 and 3.
Figure 6:
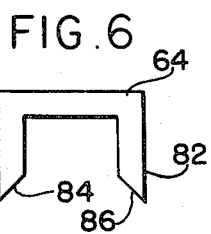
FIG. 6 is an enlarged end view of the back-electrode used in the transducer of FIG. 5.
Figure 7:
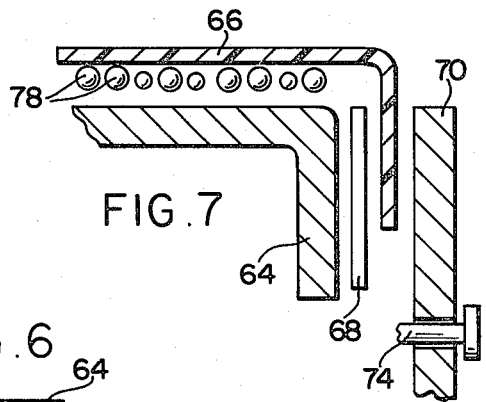
FIG. 7 is an enlarged exploded partial sectional view taken along line 7—7 of FIG. 5.

The preferred construction of the transducers 2 and 4 is illustrated in FIGS. 5-7. Sell-type transducers are well known and have been used successfully for generating acoustic waves along a linear emitting surface. Such a transducer comprises a thin film of metalized plastic, metalized on one surface to form an electrode, stretched with the metalized surface outward over a relatively massive metal back-electrode. The conductive surface of the plastic membrane forms a capacitor with the back-electrode. If the back-electrode is not perfectly uniform, irregularities on its surface produce localized concentrated electric fields in the interspace. When an ac signal, between the metalized membrane surface and the back-electrode is superimposed on a dc bias during the transmission mode of operation, the plastic film is stressed and oscillatory formations develop causing an acoustic wave front to be generated by the plastic film diaphragm. During the receiving mode, the variable acoustic pressure on the diaphragm moves the film, producing a corresponding change in voltage between the metalized film and the back-electrode.

For the present application, the transducer must be capable of producing a shockwave with a rapid rise time and of substantial intensity. Since it is important that the minimum range be as small as possible, the transducer must have a high mechanical damping factor to insure rapid decay of vibrations after the termination of the driving signal.

In the receiving mode, it is important that the transducer have enough sensitivity to detect the reflected acoustic wave. If the back-electrode has a smooth highly polished surface, the sensitivity is low: if the surface is roughened by sandblasting or is provided with minute surface grooves, the sensitivity is significantly improved. As shown in FIG. 5, the transducer 4, representative also of transducer 2, includes a generally U-shaped back-electrode 64 which may be formed of metal or metallized plastic that is covered with a thin plastic membrane 66, which is metalized on its exposed face. The membrane 66 may be formed of polyester plastic 6 micrometers in thickness and aluminized to a thickness of 0.5 micrometers on its outer surface. The membrane 66 is stretched across the face of the back-electrode 64 and is held in place along the outside edges of the back-electrode 64 by strips 68 of double-sided pressure-sensitive adhesive tape. The membrane is further held in position by being clamped between two L-shaped metal channels 70 and 72 positioned on opposite sides of the back-electrode 66 and held in compression by two bolts 74. These clamping channels 70 and 72 make electrical contact with the metalized surface of the membrane 66, but do not make electrical contact with the back-electrode 64, suitable clearance openings 76 being provided for the bolts 74. The clamping channels 70 and 72 are grounded and form an electrostatic shield for the back-electrode 64.

In order to increase the sensitivity of the transducer 2, a layer of microspheres 78 is interposed between the back-electrode 64 and the membrane 66. It is preferred that the spheres 78 have diameters between 15 and 50 micrometers, and they may comprise a mixture of spheres of different sizes within that range. The spheres may be formed of glass, plastic or other material. A convenient source of suitable spheres is from Kema-Nord Chemical Corporation of Sundsvall, Sweden, who can furnish plastic spheres each enclosing a minute quantity of gas and having an outer diameter of 3 to 10 micrometers. These spheres may be heated in air to 100° C. and then permitted to cool, a process that will increase the diameter so that a majority of the spheres are between 15 and 50 micrometers. The spheres are then applied to the surface of the back-electrode, by brushing or other means, to a density of 20 to 50 microspheres per square mm. The use of such spheres substantially increases the sensitivity of the transducer.

As stated above, it is important that the mechanical damping of the transducer occur quickly at the end of each transmitted pulse. The damping action is facilitated and undesired resonances and vibrations in the back-electrode are minimized, in this example, by the two side members 80 and 82 that have sloping edge surfaces 84 and 86, as illustrated in FIG. 6, that slope at a slight angle so they are not parallel with each other or with the plane of the surface 64 or the membrane 66.

With the construction described, the transducer 2 is capable of detecting a reflected acoustic shockwave at full receiver sensitivity within 100 microseconds after its reflection from the surface whose position is to be determined. This corresponds to a minimum ranging distance of 3 cm between the reflection surface and the transducer. The duration of the blanking pulses 38 and 38A therefore needs to be only about 200 microseconds. The rise time of the acoustic wave that is transmitted and received is typically about two microseconds, and with the use of conventional pulse timing techniques, a time resolution of plus or minus 0.2 microseconds, corresponding to a displacement uncertainty of plus or minus 0.03 mm of the reflecting surface, can be attained.

From the foregoing it will be seen that my invention represents a significant improvement in the art of graphic position-determining systems, that the transducer used therein incorporates in itself substantial improvements capable of advantageous use in other applications, and that the illustrated embodiments of the invention are adaptable to many modifications of form and arrangement to best suit them to each particular application. The combination of lower cost and improved accuracy broadens the potential field of application for devices of this type.

I claim:

1. Position-determining apparatus including
a movable object whose position between maximum and minimum limits is to be determined and which includes a surface capable of reflecting acoustic waves,
transducer means arranged to radiate acoustic waves in the direction of said object and to receive acoustic waves reflected therefrom,
pulse generation means for energizing said transducer to produce acoustic impulses,
a calibration reflector capable of reflecting acoustic waves positioned within the range of said transducer means but outside the maximum and minimum limits of position measurement, and
timing means responsive to impulses received by said transducer means to produce acoustic impulses,
wherein said timing means is operative to measure the relative reception times of pulses reflected from said object and said calibration reflector.

2. Apparatus as claimed in claim 1 wherein said transducer means is a linear Sell-type transducer.

3. Apparatus as claimed in claim 1 wherein said transducer means includes first and second transducers and including a second calibration reflector facing said second transducer.

4. Position-determining apparatus including a movable object whose position is to be determined and which includes a surface capable of reflecting airborne acoustic waves,
first and second linear transducers positioned at an angle greater than ninety degrees,
pulse generation means coupled to said first transducer,
each of said transducers being responsive to pulses radiated by said first transducer and reflected by said object, and
timing means coupled to each of said transducers responsive to airborne pulses reflected from said object and including
means for comparing the propagation time of an acoustic impulse from said first transducer to and from said object with the propagation time of an acoustic pulse traveling from said first transducer to said object and thence to said second transducer.

* * * * *